United States Patent
Sanchez Herrero (12) 
(10) Patent No.: US 6,389,283 B1
(45) Date of Patent: May 14, 2002

(54) RELEASE OF REMAINING ACTIVITIES IN VPLMNS

(75) Inventor: Juan Antonio Sanchez Herrero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/172,874

(22) Filed: Oct. 15, 1998

(51) Int. Cl.[7] .................................................. H04Q 7/20
(52) U.S. Cl. ........................ 455/433; 455/412; 455/550
(58) Field of Search .................................. 455/433, 410, 455/411, 67.1, 515, 567, 575, 415, 432, 435, 412

(56) References Cited

U.S. PATENT DOCUMENTS

| | | | | |
|---|---|---|---|---|
| 5,519,766 A | * | 5/1996 | Jones | 379/74 |
| 5,579,372 A | * | 11/1996 | Astrom | 379/58 |
| 5,603,095 A | * | 2/1997 | Uola | 455/67.1 |
| 5,628,051 A | * | 5/1997 | Salin | 455/33.1 |
| 5,646,982 A | * | 7/1997 | Hogan et al. | 379/89 |
| 5,675,629 A | * | 10/1997 | Rafel et al. | 379/58 |
| 5,819,178 A | * | 10/1998 | Cropper | 455/433 |
| 5,911,120 A | * | 6/1999 | Jarett et al. | 455/417 |
| 5,933,784 A | * | 8/1999 | Gallagher et al. | 455/552 |
| 5,953,673 A | * | 9/1999 | Neubauer et al. | 455/518 |
| 6,058,303 A | * | 5/2000 | Astrom et al. | 455/413 |
| 6,061,560 A | * | 5/2000 | Saboorian et al. | 455/433 |
| 6,119,012 A | * | 9/2000 | Amirijoo | 455/456 |
| 6,223,038 B1 | * | 4/2001 | Iseyama et al. | 455/435 |

FOREIGN PATENT DOCUMENTS

| | | | | |
|---|---|---|---|---|
| DE | | 196 44 786 | 7/1998 | H04Q/7/38 |

OTHER PUBLICATIONS

ETS 300 921 (GSM 02.11 Version 5.01): Apr. 1997.*
GSM 03.79 V5.3.0 (1998–01), European Telecommunications Standards Institute, p. 11–12.*
GSM 03.35 V1.0.0 (1998–06), European Telecommunications Standards Institute, p. 5–7.*
European Telecommunications Standards Institute, GSM Technical Specification, "Digital cellular telecommunications system (Phase 2+); Support of Optimal Routeing (SOR); Service definition (Stage 1)," GSM 02.79, Nov. 1996, pp. 1–17.
European Telecommunications Standards Institute, "Digital cellular telecommunications system (Phase 2+); Support of Optimal Routeing (SOR); Technical realisation;" GSM 03.79, Version 5.3.0, 1996, pp. 1–38.
European Telecommunications Standards Institute, "Dgital cellular telecommunications system; Service Accessibility;" GSM 02.11 Version 5.0.1, Apr. 1997, pp. 1–14.
European Telecommunications Standards Institute, "Digital cellular telecommunications system (Phase2+); Immediate Service Termination (IST) Service description—Stage 2;" GSM 03.35 Version 1.0.0, 1998, pp. 1–8.
European Telecommunications Standards Institute, "Digital cellular telecommunications system (Phase 2+); Immediate Service Termination (IST) Service description—Stage 1;" GSM 02.32 version 7.1.0, 1998, pp. 1–9.

* cited by examiner

Primary Examiner—Daniel Hunter
Assistant Examiner—Charles Chow
(74) Attorney, Agent, or Firm—Burns, Doane, Swecker & Mathis, L.L.P.

(57) ABSTRACT

A method and apparatus for releasing remaining subscriber activities through the use of a service termination command. A home public land mobile network (HPLMN) is informed of remaining activities by visited PLMNs (VPLMN) and interrogating PLMNs (IPLMN). The HPLMN sends a timer to the VPLMNs and IPLMNs in a MAP operation. If upon expiration of the timer the subscriber has remaining activities in the node, then the node sends an alert to the HPLMN. The timer may be based upon a fraud risk of the PLMN and/or of the fraud risk of the subscriber. Accordingly, the HPLMN waits for an alert from a particular node before sending a service termination to the node.

64 Claims, 7 Drawing Sheets

RELEASE OF REMAINING ACTIVITIES IN VPLMNS

BACKGROUND

The Global System for Mobile communication (GSM) describes a European standard for radiocommunication utilized by the corresponding Public Land Mobile Networks (PLMNs) in the region and in many other countries, which standard is intended to provide uniformity so that users can access radiocommunication systems throughout Europe and many other countries with minimal equipment compatibility problems. In addition to lower level details such as modulation, frame formats, etc., the GSM standard also specifies standard higher level activities which can be performed within the system. There are many such activities which may be associated with a particular subscriber in the GSM network including call related events such as call set-up, and call termination. Other types of subscriber activities include invocation of call related and call independent supplementary services such as call hold, call waiting, call transfer, and call forwarding. Based upon roaming agreements between the different mobile network operators, mobile subscribers belonging to a specific (home) PLMN, referred to herein as an HPLMN, can make use of their subscribed services and facilities while roaming on other PLMNs, referred to as the visited PLMN (VPLMN).

Figure 1:
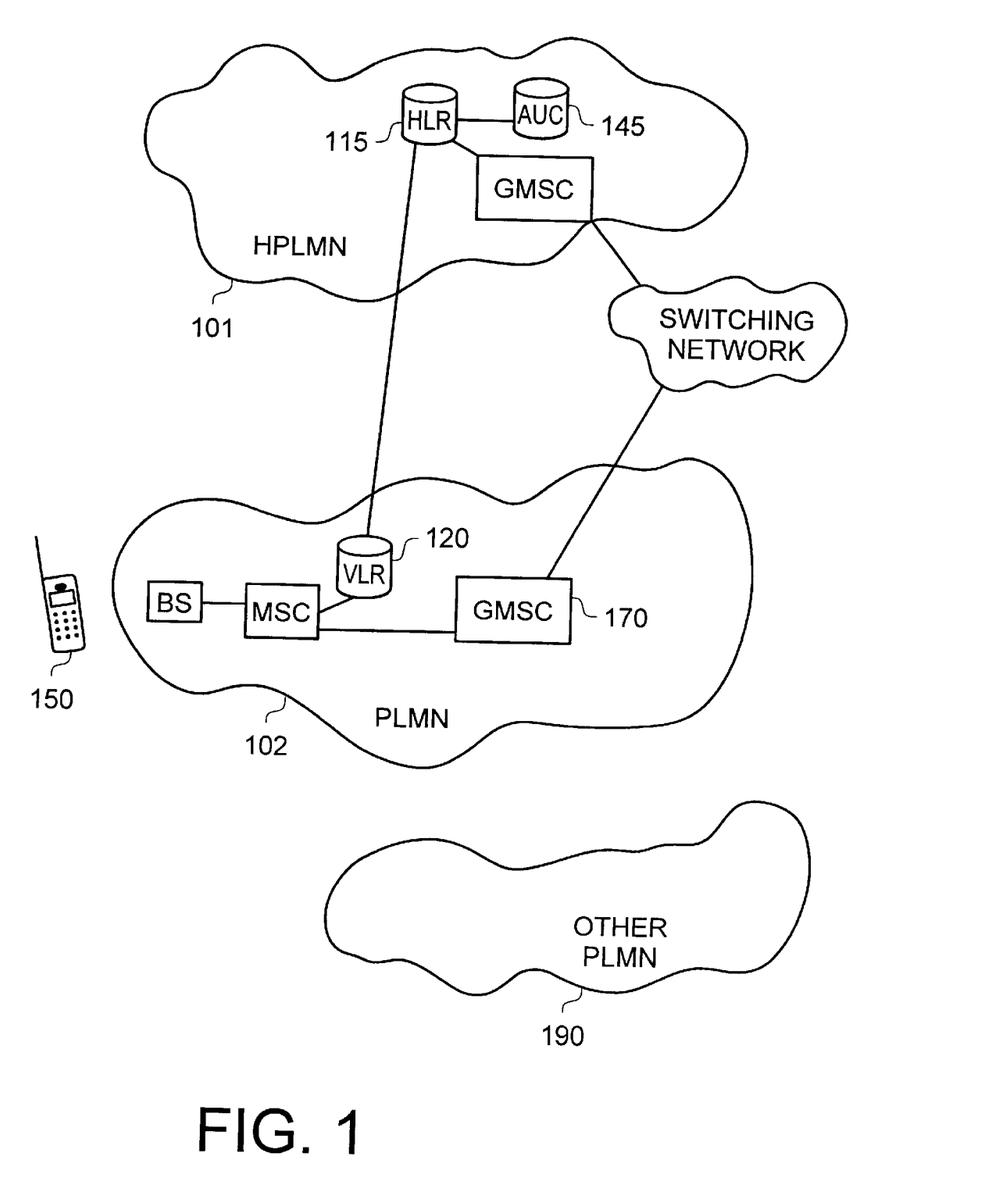
FIG. 1 illustrates the network architecture of an exemplary GSM network.

FIG. 1 illustrates the network architecture used in GSM systems. Home location register (HLR) 115 stores data relating to subscribers including, for example, current location of the subscriber equipment, directory number (MSISDN), radio number plan identification (e.g., International Mobile Subscriber Identity (IMSI)), supplementary service profiles and teleservice profiles. Visitor location register (VLR) 120 manages data associated with subscribers which are currently situated within its area of responsibility, e.g., those mobiles which have roamed into its service area. Authentication Center (AUC) 145 works in close association with HLR 115, wherein AUC 145 provides the information to authenticate all calls in order to guard against possible fraud, stolen subscriber cards or unpaid bills.

When mobile unit 150, a subscriber of HPLMN 101, tries to invoke a subscriber activity while in PLMN 102, VLR 120 requests a "triplet" of information from HLR 115 in order to determine whether mobile unit 150 is authorized to use the particular service. The "triplet" consists of a random number (RAND), a signed response (SRES) and a key cipher (Kc), which are generated by AUC 145. The "triplet" of information is requested by HLR 115 and stored therein. The "triplet" of information is transmitted to VLR 120 from HLR 115 in response to a specific request from VLR 120, e.g., during location updating. VLR 120 transmits the RAND to mobile unit 150. In response mobile unit 150 performs a calculation based upon the RAND in order to determine a SRES which is transmitted to VLR 120. VLR 120 compares the SRES received from HLR 115 and the SRES received from mobile unit 150. If the SRESs match then VLR 120 determines that mobile unit 150 is authorized. HLR 115 updates its database to indicate that mobile unit 150 is located in VLR 120.

When mobile unit 150 moves from PLMN 102 to PLMN 190, mobile unit 150 recognizes the change and sends a location updating message to the new VLR (not shown) in PLMN 190. The new VLR informs HLR 115 of the new location of mobile unit 150. HLR 115 then sends a Cancel Location message to previously visited VLR 120, located in PLMN 102, to indicate that mobile unit 150 is no longer present in the area served by PLMN 102. HLR 115 sends an insert subscriber data (ISD) message to the new VLR which provides the new VLR with the relevant subscriber data.

This architecture supports simultaneous activities in different VLRs in case of subscriber movement. In addition, activities on different gateway mobile switching centers (GMSCs) may be maintained simultaneously in certain service scenarios. One scenario in which there are simultaneous subscriber activities is support for optimal routing, a network feature which enables the calls directed to a mobile subscriber to be routed directly to the mobile subscriber's actual location, or to her forwarded-to destination (instead of via the HPLMN or in the case of Late Call Forwarding via the VPLMN). For instance, in an exemplary optimal routing scenario, an HLR may receive Send Routing Information (SRI) messages from more than one GMSC. The PLMN associated with a GMSC in an optimal routing scenario is referred to as an interrogating PLMN (IPLMN). The IPLMN interrogates the HPLMN of a called party in order to determine the whereabouts of that party. The interested reader may refer to GSM standard documents numbered 02.79 and 03.79 for more details of the optimal routing feature.

Allowing simultaneous subscriber activities in GSM make certain fraud scenarios very difficult to control by the network operator due to the fact that a legitimate subscriber may invoke several subscriber activities in a single network or in different networks. It is possible for a subscriber to enter an area served by a particular MSC/VLR while still having subscriber activities which are ongoing in a VLR associated with a previously visited MSC/VLR area which the subscriber has left. For instance, referring again to FIG. 1, mobile unit 150 may initiate a call forwarding service in GMSC 170 while located in the area served by PLMN 102. Mobile unit 150 may then move into the area served by PLMN 190 and invoke another call service, without canceling the call forwarding service activated while mobile unit 150 was located in the area served by PLMN 102. Therefore, mobile unit 150 will have activities in both PLMN 102 and PLMN 190 which appear to an operator of a PLMN as fraudulent subscriber activity.

Figure 2:
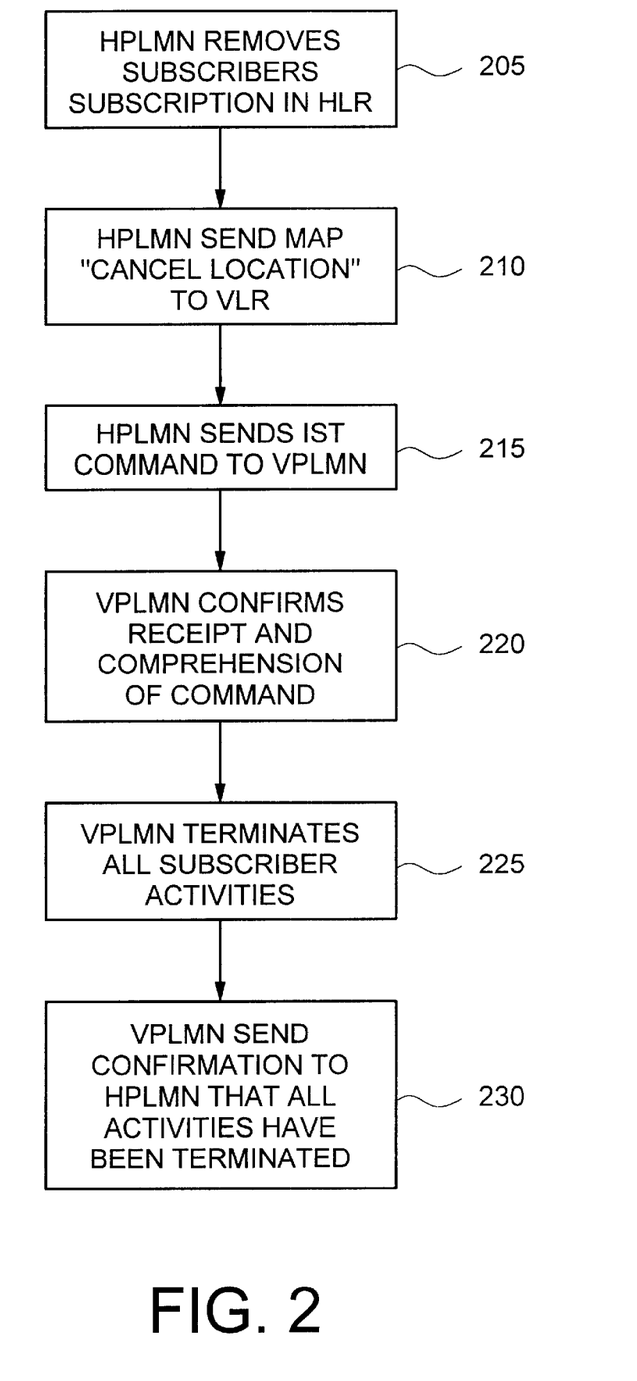
FIG. 2 illustrates a flow chart of the invocation of the IST command from an HPLMN to a VPLMN.

An HPLMN may control fraudulent subscriber activity using an Immediate Service Termination (IST) command to terminate the fraudulent activity. FIG. 2 illustrates the implementation of the IST command. In step 205, the HPLMN changes the subscriber's entry in the HLR, e.g. by removing the subscribers subscription, in order to prevent the subscriber from resuming activities in the HPLMN and VPLMN after the invocation of the IST command. In step 210, the HPLMN sends a Mobile Application Part (MAP) Cancel Location command to the VLR in order to prevent the resumption of activity by the subscriber within the VPLMN without the need to reference the HPLMN. In step 215, the HPLMN sends an IST command to the VPLMN. In step 220, the VPLMN confirms receipt and comprehension of the IST command. In step 225, the VPLMN terminates all activities of the subscriber which were indicated by the IST command. In step 230, the VPLMN sends confirmation to the HPLMN that all activities have been terminated.

As stated above, a subscriber may have remaining activities in PLMNs where the subscriber is no longer located. In order for the IST command to be truly effective, all subscriber activity should be terminated. Hence, there is a need for the HLR to track subscriber activity not only in the current VPLMN, but also in all PLMNs in which the subscriber has remaining activities. There are several proposed solutions which attempt to address this issue.

One solution is based upon custom applications for mobile network enhanced logic (CAMEL). CAMEL provides international intelligent network services for the GSM. CAMEL can be used to terminate all originated, terminated and forwarded calls of a subscriber, provided there is a control relationship between the CAMEL server in the HPLMN and the MSC controlling the call or forwarding leg. Using CAMEL requires the service control point (gsmSCP) to control all ongoing calls. As the amount of subscribers who are using CAMEL increases, the capacity required of the gsmSCP and the service switching point (gsmSSP) likewise increase which leads to a greater expense in monitoring the remaining activities. Normally, when a subscriber has been removed from the HLR it shall be communicated to the SCP to start the IST procedure. However, such an operation cannot occur through the use of CAMEL because the standard fails to define any coordination between the gsmSCP data and the HLR data.

Another solution is based upon subscriber activity reporting from the VLR to the HLR. In the GMSC a timer is setup on a per call basis at the start of any call forwarding. An IST alert is then sent when the call is active longer than the timer limit. The sending of the IST alert is repeated upon each occurrence of the expiration of the timer. However, upon the expiration of the timer the call is not released. In a visited MSC (VMSC), the timer starts after cancellation of the data in the VLR, if the subscriber still has remaining activities. Similar to the description above in regard to the GMSC, an IST alert is sent to the HLR upon each expiration of the timer. If the HLR determines that it is necessary to terminate all of the activities of a subscriber, the HLR can send to the previously visited MSC/VLRs or to the GMSC an IST command upon reception of the IST alert, in order to stop all remaining activities.

This solution has many drawbacks, including the large network capacity which is required in the MSC/VLR because of the need to set a timer for all calls, as compared to setting timers for only the most risky subscribers and PLMNs. Since the timer in the MSC/VLR is not transmitted in the network, the HPLMN does not know how much time to wait for incoming IST alert messages because such messages are controlled by the VPLMNs. According to this solution the timer is fixed regardless of the fraud risk posed by a particular subscriber.

SUMMARY

These and other drawbacks and difficulties found in conventional radio communication systems, for example the GSM system, are overcome according to the present invention. According to exemplary embodiments of the present invention, the HPLMN does not control the ongoing activities in the VPLMN, nor in the IPLMN. The HPLMN is informed of remaining activities by the VPLMN and the IPLMN during certain time periods. For example, reporting to the HPLMN starts when a Cancel Location command is invoked or Send Routing Information command is answered. The period for notification regarding ongoing activities is set by the HPLMN in the VPLMN and the IPLMN on a per subscriber basis, based upon the fraud risk posed by a particular subscriber. Alternatively, the period for notification may be set based upon the risk associated with the particular PLMN which is controlling the subscriber activity. Various time periods may be set depending upon this risk. According to an exemplary embodiment of the present invention the time periods may be set based upon a combination of the risk posed by a particular subscriber and the risk posed by a particular PLMN. Before issuing an IST command to a GMSC or a previously visited MSC/VLR, the HPLMN waits for notification via an IST alert of the ongoing activities based on the amount of time assigned per subscriber. According to an exemplary embodiment of the present invention, the GMSC or MSC/VLR can indicate to the HLR whether service termination is supported by the node.

BRIEF DESCRIPTION OF THE DRAWINGS

The foregoing objects, features and advantages of the present invention will be more readily understood upon reading the following detailed description in conjunction with the drawings in which.

DETAILED DESCRIPTION

Figure 3:
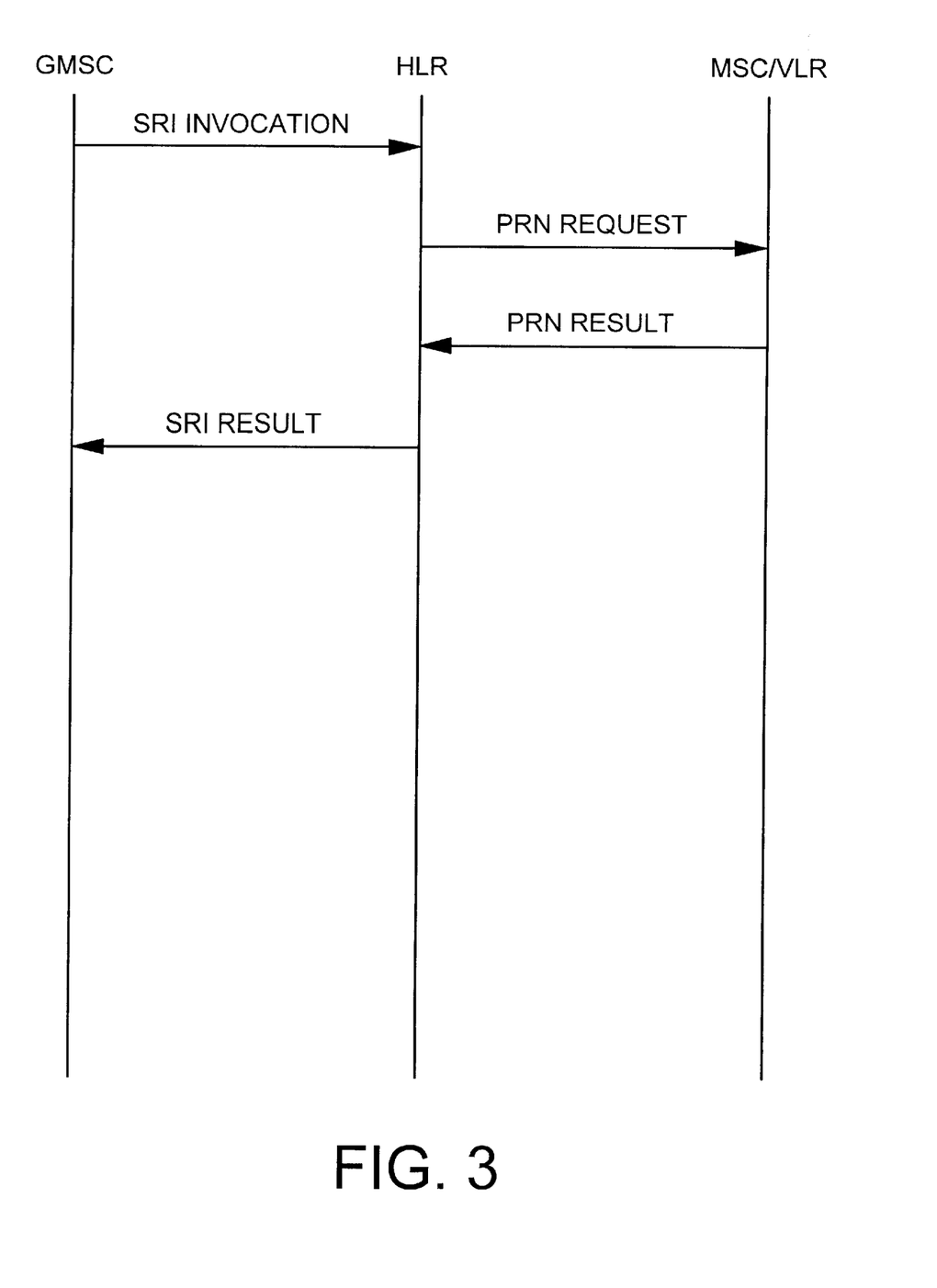
FIG. 3 shows signaling between a GMSC, an HLR and a VLR according to an exemplary embodiment.

FIG. 3 is a node diagram illustrating communication according to an exemplary embodiment of the present invention between a GMSC, an HLR, and a MSC/VLR when a mobile subscriber who is currently located in an area serviced by a VPLMN receives a call. The GMSC interrogates the HLR to determine where the mobile subscriber is currently located by sending a SRI invocation message to the HLR. The HLR sends a provide roaming number (PRN) request to the MSC/VLR where the subscriber is currently registered, in order to determine the Mobile Subscriber Roaming Number (MSRN). The MSC/VLR checks its database and sends the MSRN of the mobile subscriber to the HLR which in turn sends the MSRN to the GMSC in an SRI result message. The GMSC uses this information to route the call to the mobile subscriber.

According to an exemplary embodiment of the present invention, the HLR can, depending upon the particular subscriber and/or the particular PLMN, include an order to the GMSC instructing it to notify the HLR of any remaining subscriber activity (e.g., a call belonging to a call forwarding invocation for this subscriber). This can be accomplished by sending a timer to the GMSC using, for example, a SRI MAP command to send a time value which can be used in a down counter (not shown) in the GMSC. In order to reduce signaling, the GMSC may control the timer on a subscriber basis, as compared to controlling the timer on the basis of activities (e.g. calls). Accordingly, the GMSC will track the remaining activities associated with this subscriber and inform the HLR via an IST alert after each predetermined time period about the remaining activities in the node. The IST alert contains the address of the MSC controlling the call. Thus, the sending of the IST alert from the GMSC to the HLR starts when the SRI invocation message is answered, if it is indicated by the HLR and thereafter when the predetermined time period from the last received SRI result message has elapsed. The IST alert message will be sent after the expiration of each timer until the reception of an IST command or until the subscriber does not have any remaining activities. Usually only one GMSC sends the SRI to the HLR for a particular subscriber, in this case the alert can be omitted if the HLR knows which GMSC is serving the subscriber.

According to an exemplary embodiment, the SRI invocation message may include an indication of whether the GMSC supports the IST command. If the GMSC does not support the IST command, the system operator has several options. The HLR may limit the service for the subscriber, for example by temporarily activating an operator determined barring of incoming calls, and temporarily deactivating the call forwarding services invoked in the GMSC. Alternatively, the system operator may choose to control the incoming calls by other means. In an exemplary embodiment, the operator may choose to release the incoming calls by sending an IST command to an associated MSC/VLR. The associated MSC/VLR will use an ISDN release procedure to terminate the remaining activity in the GMSC. Of course, the operator may choose to assume the risk associated with not being able to invoke the IST command.

Figure 4:
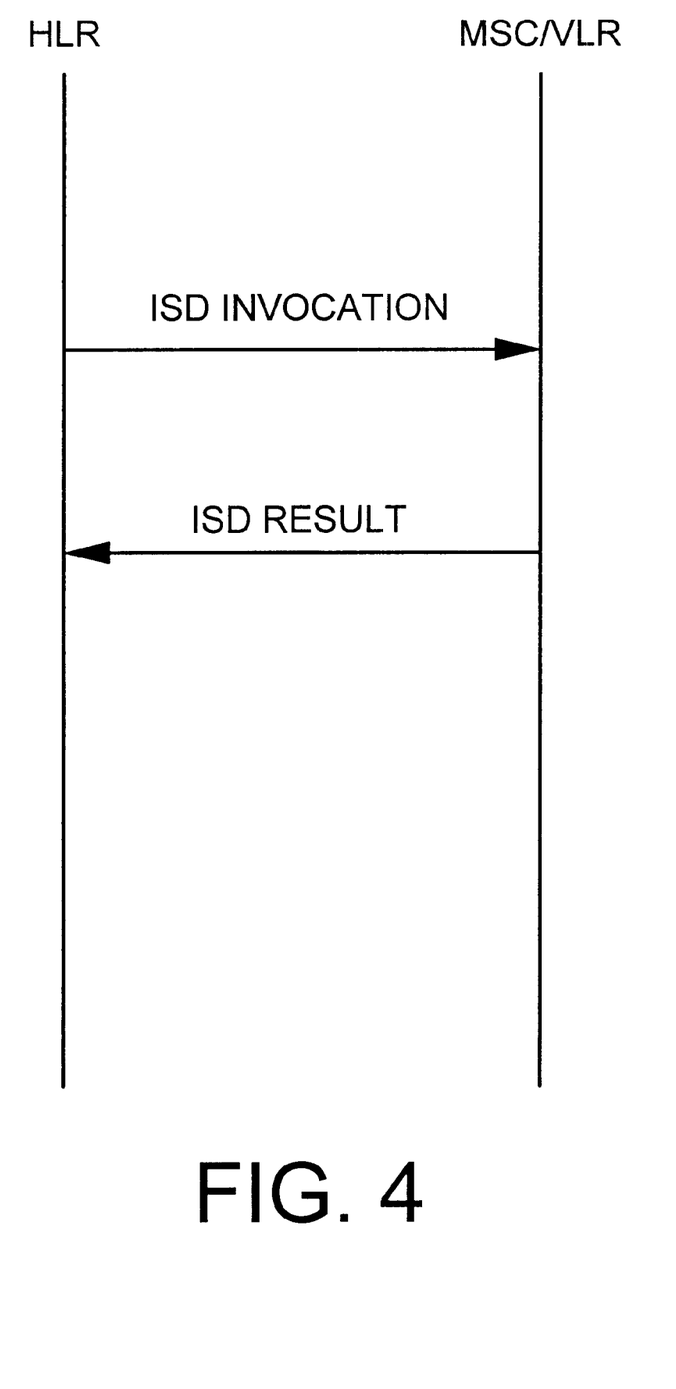
FIG. 4 shows signaling of Insert Subscriber Data messages between an HLR and an MSC/VLR according to an exemplary embodiment.

FIG. 4 is a node diagram illustrating communication between the HLR and the MSC/VLR when a mobile subscriber changes location or when new services are being provided for a particular subscriber according to an exemplary embodiment of the present invention. When the HLR is informed by a particular MSC/VLR that the mobile subscriber is located in the operating area serviced by the MSC/VLR, the HLR will send an Insert Subscriber Data (ISD) invocation message to the MSC/VLR as a consequence of the location updating procedure. According to an exemplary embodiment, the ISD invocation message can include a timer for use in an IST alert. The timer may be represented by a parameter in a MAP command sent to the MSC/VLR. The sending of the timer indicates to the MSC/VLR that the IST alert function is requested by the HLR. In addition to the normal contents of the ISD result message, which is sent from the MSC/VLR to the HLR, the MSC/VLR may indicate that the IST alert functionality is supported by the node.

According to an exemplary embodiment of the present invention the timer may be updated through the use of ISD messages and Delete Subscriber Data (DSD) messages. DSD messages are used to remove subscriber data from the MSC/VLR when information regarding the subscribers subscription in the HLR has changed. The timer in the ISD message and the DSD message replace the timer which was previously sent to the MSC/VLR.

If the MSC/VLR does not support IST then the system operator has several options. The operator may choose to limit the service for the subscriber by temporarily activating an operator determined barring of roaming, incoming or outgoing calls. The operator may choose to control the incoming calls by other means such as releasing the incoming calls by an IST command in the GMSC. The GMSC will use an ISDN release procedure to terminate the remaining activity in the MSC/VLR. Of course, the operator may allow the service and assume the risk associated with not having the IST command available.

Figure 5:
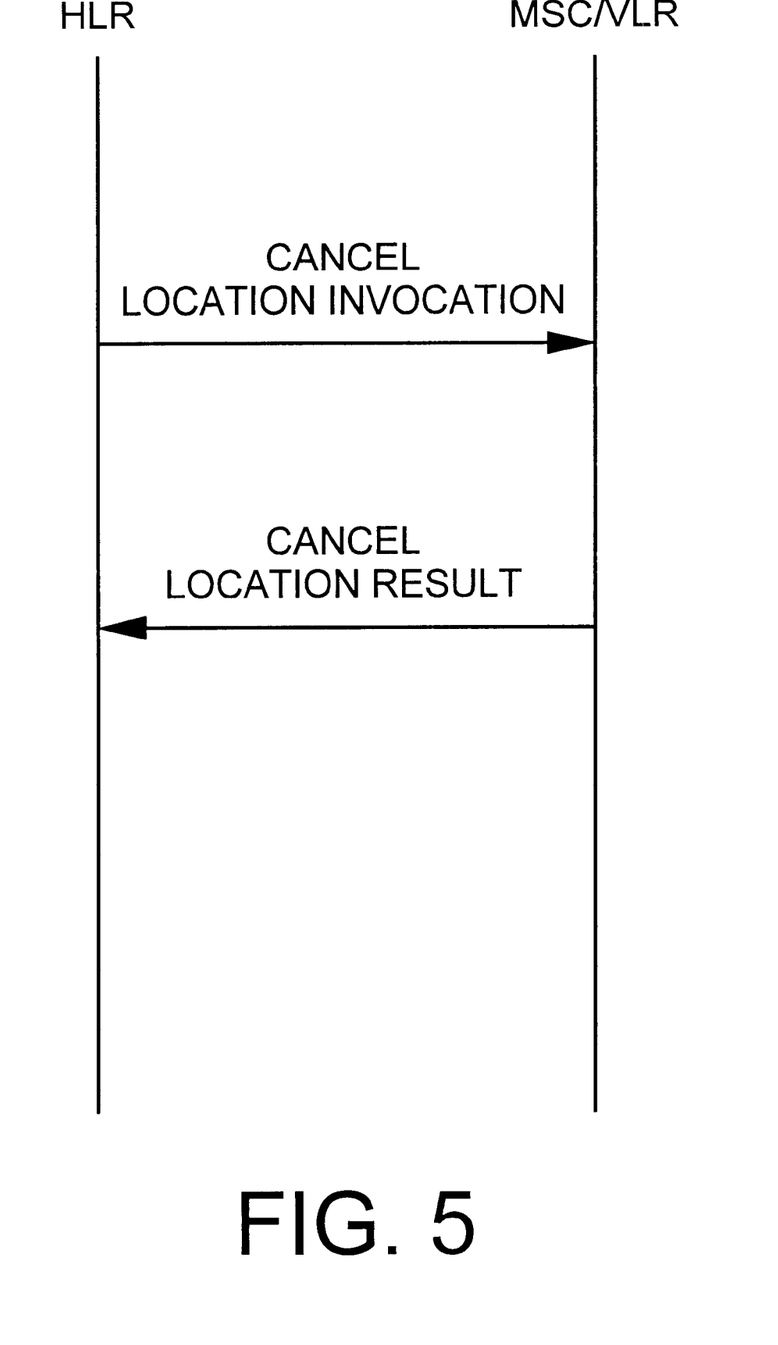
FIG. 5 shows signaling of Cancel Location messages between an HLR and a MSC/VLR according to an exemplary embodiment.

FIG. 5 is a node diagram illustrating communication between an HLR and a previously visited MSC/VLR when a mobile subscriber changes location according to an exemplary embodiment of the present invention. When the HLR has determined that the mobile subscriber is no longer in the operating area serviced by a particular MSC/VLR, the HLR will send a Cancel Location invocation message to the MSC/VLR. According to an exemplary embodiment of the present invention the Cancel Location invocation message may include the timer for sending an IST alert while the subscriber's activities remains, if a timer was not previously included in the ISD invocation message. In response to the Cancel Location invocation message from the HLR, the MSC/VLR sends a Cancel Location result message back to the HLR. The MSC/VLR tracks the subscriber's remaining activities and informs the HLR after expiration of the timer about the remaining activities in the node for that subscriber. Thus, the timer in the MSC/VLR starts after a Cancel Location invocation message is received.

Figure 6:
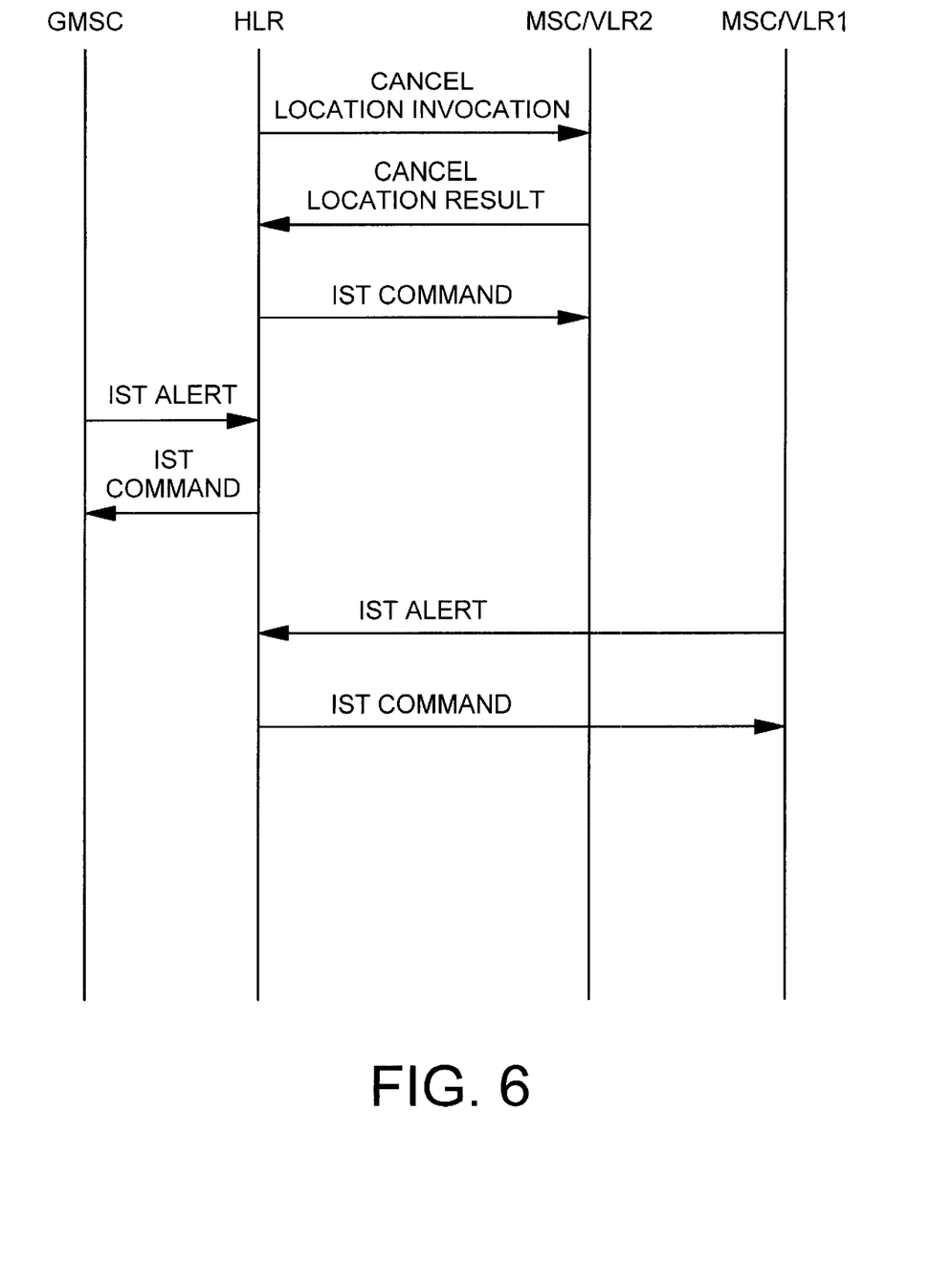
FIG. 6 shows signaling between several nodes according to an exemplary embodiment.

FIG. 6 illustrates a node diagram associated with an exemplary invocation of the IST command. According to an exemplary embodiment of the present invention, when the HLR has decided to perform the IST procedure for a certain subscriber who is currently located in MSC/VLR2, a Cancel Location invocation message is sent from the HLR to MSC/VLR2. A Cancel Location result message is returned from MSC/VLR2 to the HLR. After that, an IST command is directed to MSC/VLR2. The HLR then awaits reports of remaining activities from other nodes, which reports are forwarded according to the timer set by the HLR for the particular subscriber in a GMSC and MSC/VLR1. In this exemplary embodiment, the GMSC sends an IST alert to the HLR because the GMSC has determined that there are remaining subscriber activities in the node and that a timer which was previously sent from the HLR has expired. According to an exemplary embodiment of the present invention, a response (not shown) is sent from the HLR to the GMSC indicating that the IST alert command has been received. Alternatively, if it is desired to keep the amount of signaling to a minimum, the HLR may simply receive the IST alert without responding to the GMSC. Since the HLR has been informed that the subscriber has remaining activities in the GMSC, the HLR sends an IST command to the GMSC. If MSC/VLR1 determines that the subscriber has remaining activities in the node and that a timer which was previously sent from the HLR has expired, then MSC/VLR1 sends an IST alert to the HLR. Since the HLR has been informed that the subscriber has remaining activities in MSC/VLR1, the HLR responds with an IST command to MSC/VLR1.

Figure 7:
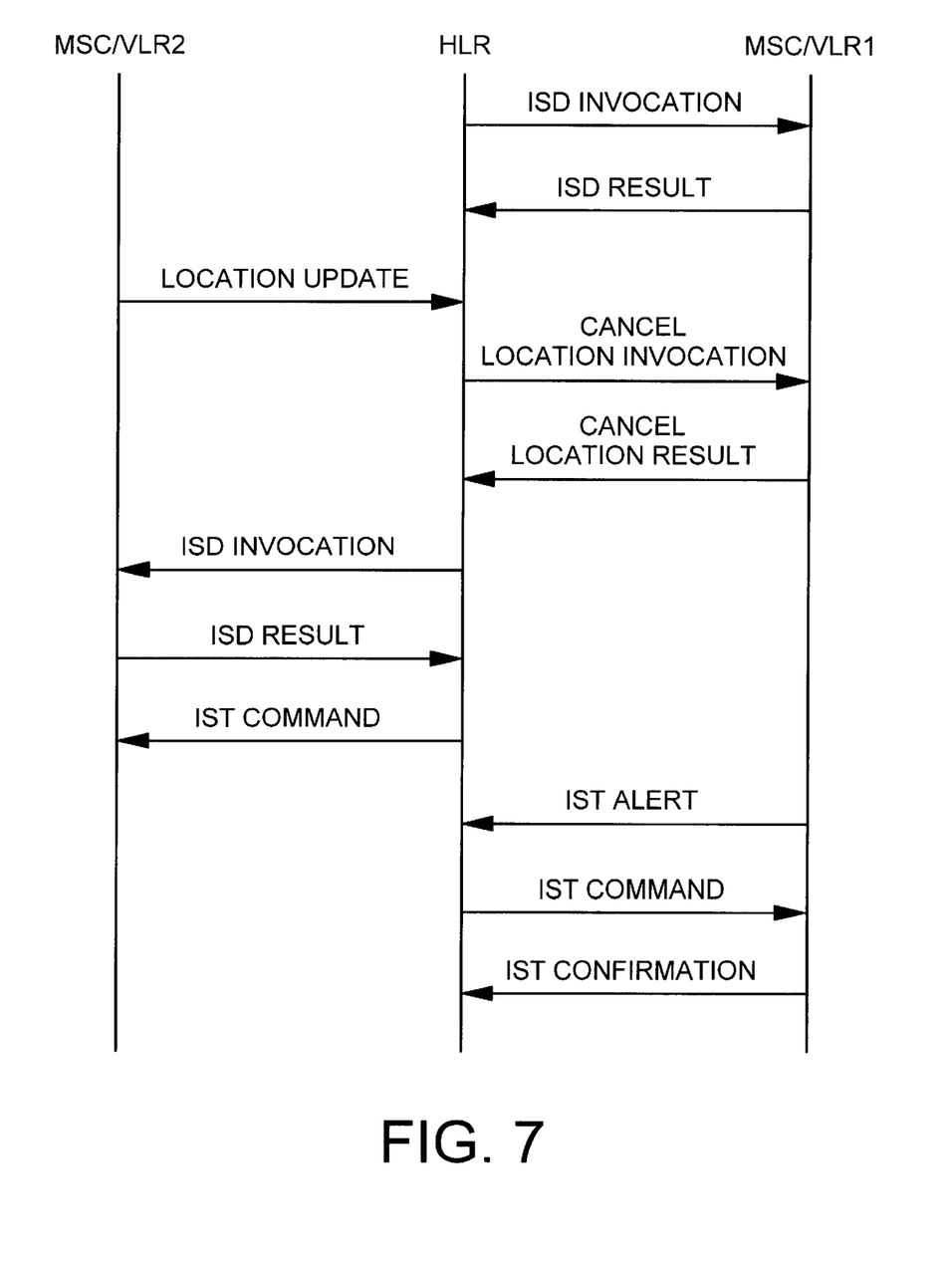
FIG. 7 show signaling between several nodes according to another exemplary embodiment.

FIG. 7 illustrates a node diagram associated with an alternate exemplary invocation of the IST command. When a mobile unit is registered as being associated with the MSC/VLR1, the HLR sends a timer along with an ISD invocation message to MSC/VLR1. MSC/VLR1 sends an ISD result message to the HLR. When a mobile unit enters the area of coverage associated with MSC/VLR2, the mobile unit sends a message (not shown) to MSC/VLR2. MSC/VLR2 in turn sends a location update message to the HLR. The HLR then sends a Cancel Location invocation message to MSC/VLR1. According to this exemplary embodiment the Cancel Location invocation message does not contain a timer, but instead instructs MSC/VLR1 to begin the timer which was sent with the ISD invocation message. MSC/VLR1 sends a Cancel Location result message back to the HLR.

The HLR then sends a timer along with an ISD invocation message to MSC/VLR2. MSC/VLR2 returns an ISD result back to the HLR. If the HLR decides to terminate the service of the mobile subscriber, the HLR sends an IST command to MSC/VLR2 which will immediately terminate all of the active services, in MSC/VLR2 for the particular subscriber. It is noted that since the subscriber was last active in the MSC/VLR2, a timer was never started in MSC/VLR2 and the HLR does not need to wait for an IST alert in order to send the IST command to MSC/VLR2. Next, the HLR waits a predetermined amount of time for any IST alerts associated with the particular subscriber. The predetermined amount of time is set by the HLR as described below. In this exemplary embodiment, upon expiration of the timer the subscriber has remaining activities in the node, MSC/VLR1 sends an IST alert to the HLR. The HLR recognizes the IST alert as being associated with the particular subscriber and sends an IST command to MSC/VLR1. MSC/VLR1 returns an IST confirmation message to the HLR, confirming that all of the subscriber activities associated with the particular subscriber have been terminated.

Accordingly, since the timer is sent from the HLR on a per subscriber basis with for example a MAP message such as a Cancel Location invocation message, an Insert Subscriber Data invocation message, a Delete Subscriber Data invocation message or a Send Routing Information result message, the amount of time for which the timer is set can be personalized for each particular subscriber. For instance, if a particular subscriber is a low risk, e.g., a corporate subscriber, the timer can be set to a long time (e.g., hours) or even not set at all. However, a subscriber with a particularly high risk, e.g., a new subscriber, can have the timer set such that reports of remaining activities are sent to the HLR on a relatively frequent basis (e.g., every few minutes).

There are several advantages associated with setting of the timer based upon risk. One advantage is that the network load associated with reporting remaining activities is lightened compared to prior solutions since a majority of the subscribers will be judged as a low risk. For such subscribers, the frequency of reporting is decreased or reporting may be eliminated entirely. Another advantage is that if an IST command is invoked, the remaining activities of a high risk subscriber will be terminated quickly, since the reports regarding these subscribers are sent on a frequent basis.

According to an exemplary embodiment, the timer may be based upon a particular risk associated with different PLMNs, in addition to basing the timer setting on subscriber risk. When a subscriber is roaming outside the HPLMN country the terminating calls involve an international roaming leg. Since not all PLMNs offer the same fraud prevention mechanisms, the HLR can set the timer based upon the type of fraud prevention mechanisms present in a particular PLMN.

In addition to setting the timer, the HLR stores all the timers which it has associated with a particular subscriber or a particular PLMN. When an IST command is sent to the current MSC/VLR, the HLR begins the timer associated with the PLMN and the subscriber. If the HLR does not receive an IST alert before the expiration of the timer, the HLR assumes that the subscriber does not have any remaining activities.

According to an exemplary embodiment, the present invention may be implemented in an international roaming scenario wherein the HLR will be located in an HPLMN and the MSC/VLRs will be located in other PLMNs. In the international roaming scenario, the HLR will be located in one country and the MSC/VLRs can be located in other countries. Further, the MSC/VLRs may all be located in the same PLMN or in different PLMNs. According to another exemplary embodiment, the present invention may be implemented in a national roaming scenario wherein the HLR and the MSC/VLRs are located in a single PLMN and the mobile subscriber moves from one MSC/VLR to another MSC/VLR in the PLMN.

While the present invention has been described using the forgoing exemplary embodiments, these embodiments are intended to be illustrative in all respects, rather than restrictive of the present invention. Thus, the scope of the present invention is instead set forth by the appended claims and encompasses any and all equivalents and modifications embraced thereby.

What is claimed is:

1. A method for monitoring a subscriber's activities in a radiocommunication system comprising the steps of:
    sending a first timer value from a home location register (HLR) with a message to a first node associated with said subscriber's activities;
    waiting, in said first node associated with said subscriber's activities, until a first time period based on said first timer value has elapsed; and
    reporting activities in said first node associated with said subscriber to the HLR upon expiration of said timer value.

2. The method of claim 1, wherein said first node is a GMSC.

3. The method of claim 2 further comprising the step of:
    indicating to the HLR in a Send Routing Information invocation message whether service termination is supported by said GMSC.

4. The method of claim 2, wherein said message is a MAP operation.

5. The method of claim 4, wherein said MAP operation is a Send Routing Information result and said first timer is a parameter in the MAP operation.

6. The method of claim 1, wherein said first node is a MSC/VLR.

7. The method of claim 6, wherein said message is a MAP operation.

8. The method of claim 7, wherein said MAP operation is a Cancel Location invocation and said first timer is a parameter in the MAP operation.

9. The method of claim 7, wherein said MAP operation is an Insert Subscriber Data invocation and said first timer is a parameter in the MAP operation.

10. The method of claim 9, wherein said first time period begins when said MSC/VLR receives a Cancel Location invocation.

11. The method of claim 9, wherein said first time period is replaced by a time period contained in a Cancel Location invocation when said MSC/VLR receives the Cancel Location invocation.

12. The method of claim 6 further comprising the step of:
    indicating to the HLR in an Insert Subscriber Data result message whether service termination is supported by said MSC/VLR.

13. The method of claim 1, further comprising the steps of:
    receiving at least a second timer value at said first node; and
    replacing said first time period based on said first timer value with at least a second time period based on said at least a second timer value.

14. The method of claim 1, further comprising the steps of:
    determining a risk associated with said subscriber; and setting said first timer value based upon said risk.

15. The method of claim 14, wherein said first time period based on said first timer value is set to a shorter period of time as the risk associated with said subscriber increases.

16. The method of claim 14, wherein said first time period based on said first timer value is set to a longer period of time as the risk associate with said subscriber decreases.

17. The method of claim 1, further comprising the steps of:
   determining a risk associated with said first node; and
   setting said first timer value based upon said risk.

18. The method of claim 17, wherein said first time period based on said first timer value is set to a longer period of time as the risk associate with said first node decreases.

19. The method of claim 17, wherein said first time period based on said first timer value is set to a shorter period of time as the risk associated with said first node increases.

20. The method of claim 1, further comprising the steps of:
   determining a first risk associated with said subscriber;
   determining a second risk associated with said first node; and
   setting said first timer based upon said first and second risk.

21. The method of claim 1, further comprising the steps of:
   determining whether the subscriber's activities shall be terminated; and
   sending a service termination command from the HLR to said first node if remaining activities are reported after said first time period has ended.

22. The method of claim 21, wherein said service termination is also sent to a node where the subscriber is currently located.

23. The method of claim 1, further comprising the steps of:
   waiting, in said HLR, until said first time period based on said first timer value has elapsed; and
   determining said subscriber does not have activities in said first node if said HLR does not receive a report when said first time period has elapsed.

24. The method of claim 1, further comprising the steps of:
   sending a second timer value, different than said first timer value, to a second node associated with said subscriber's activities; and
   reporting activities in said second node associated with said subscriber's activities after a second time period associated with said second timer value has expired.

25. The method of claim 24, wherein said second node belongs to a different public land mobile network (PLMN) than said first node.

26. The method of claim 1, wherein said subscriber's activities include call set up, call termination, call hold, call waiting, call transfer, and call forwarding.

27. In a GSM radiocommunication system, a method for tracking subscriber activities when a subscriber is no longer within a visiting location register's (VLR's) zone of responsibility, comprising the steps of:
   sending a timer along with a message to the VLR,
   wherein, upon expiration of the timer the VLR sends an IST alert to an HLR associated with said subscriber if there are any activities associated with said subscriber in said VLR.

28. The method of claim 27, wherein said message is an Insert Subscriber Data invocation.

29. The method of claim 28, wherein said timer start upon receipt of a Cancel Location invocation.

30. The method of claim 27, wherein said message is a Cancel Location invocation.

31. The method of claim 27, wherein said subscriber activities include call set up, call termination, call hold, call waiting, call transfer, and call forwarding.

32. An apparatus for monitoring a subscriber's activities in a radiocommunication system comprising:
   means for sending a first timer value from a home location register (HLR) with a message to a first node associated with said subscriber's activities;
   means for waiting, in said first node associated with said subscriber's activities, until a first time period based on said first timer value has elapsed; and
   means for reporting activities in said first node associated with said subscriber to the HLR upon expiration of said first timer value.

33. The apparatus of claim 32, wherein said first node is a GMSC.

34. The apparatus of claim 33, further comprising:
   means for indicating to the HLR in a Send Routing Information invocation message whether service termination is supported by said QMSC.

35. The apparatus of claim 33, wherein said message is a MAP operation.

36. The apparatus of claim 35, wherein said MAP operation is a Send Routing Information result and said first timer is a parameter in the MAP operation.

37. The apparatus of claim 32, wherein said first node is a MSC/VLR.

38. The apparatus of claim 37, wherein said message is a MAP operation.

39. The apparatus of claim 38, wherein said MAP operation is a Cancel Location invocation and said first timer is a parameter in the MAP operation.

40. The apparatus of claim 38, wherein said MAP operation is an Insert Subscriber Data invocation and said first timer is a parameter in the MAP operation.

41. The apparatus of claim 40, wherein said first time period begins when said MSC/VLR receives a Cancel Location invocation.

42. The apparatus of claim 40, wherein said first time period is replaced by a time period contained in a Cancel Location invocation when said MSC/VLR receives the Cancel Location invocation.

43. The apparatus of claim 37 further comprising:
   means for indicating to the HLR in an Insert Subscriber Data result message whether service termination is supported by said MSC/VLR.

44. The apparatus of claim 32, further comprising:
   means for receiving at least a second timer value at said first node; and
   means for replacing said first time period based on said first timer value with at least a second time period based on said at least a second timer value.

45. The apparatus of claim 32, further comprising:
   means for determining a risk associated with said subscriber; and
   means for setting said first timer value based upon said risk.

46. The apparatus of claim 45, wherein said first time period based on said first timer value is set to a shorter period of time as the risk associated with said subscriber increases.

47. The apparatus of claim 45, wherein said first time period based on said first timer value is set to a longer period of time as the risk associate with said subscriber decreases.

48. The apparatus of claim 32, further comprising:

means for determining a risk associated with said first node; and means for setting said first timer value based upon said risk.

49. The apparatus of claim 48, wherein said first time period based on said first timer value is set to a longer period of time as the risk associate with said first node decreases.

50. The apparatus of claim 48, wherein said first time period based on said first timer value is set to a shorter period of time as the risk associated with said first node increases.

51. The apparatus of claim 32, further comprising:

means for determining a first risk associated with said subscriber;

means for determining a second risk associated with said first node; and means for setting said first timer based upon said first and second risk.

52. The apparatus of claim 32, further comprising:

means for determining whether the subscriber's activities shall be terminated; and means for sending a service termination command from the HLR to said first node if remaining activities are reported after said first time period has ended.

53. The apparatus of claim 52, wherein said service termination is also sent to a node where the subscriber is currently located.

54. The apparatus of claim 32, further comprising:

means for waiting, in said HLR, until said first time period based on said first timer value has elapsed; and means for determining said subscriber does not have activities in said first node if said HLR does not receive a report when said first time period has elapsed.

55. The apparatus of claim 32, further comprising:

means for sending a second timer value, different than said first timer value, to a second node associated with said subscriber's activities; and means for reporting activities in said second node associated with said subscriber's activities after a second time period associated with said second timer value has expired.

56. The apparatus of claim 55, wherein said second node belongs to a different public land mobile network (PLMN) than said first node.

57. The apparatus of claim 32, wherein said subscriber's activities include call set up, call termination, call hold, call waiting, call transfer, and call forwarding.

58. A method for monitoring a subscriber's call related events in a radiocommunication system comprising the steps of:

sending a first timer value from a home location register (HLR) with a message to a first node in which the subscriber's call related events are pending;

waiting in the first node until a first time period based on the first timer value has elapsed; and reporting the subscriber's call related events in the first node to the HLR upon expiration of the timer value.

59. The method of claim 58, wherein the subscriber's call related invents include call set up, call termination, call hold, call waiting, call transfer, and call forwarding.

60. In a GSM radiocommunication system, a method for tracking a subscriber's call related events when the subscriber is no longer within a visiting location register's (VLR's) zone of responsibility, comprising the steps of:

sending a timer value along with a message to the VLR; and sending from the VLR an IST alert to an home location register (HLR) of the subscriber upon expiration of the timer value if there are any subscriber's call related events pending in the VLR.

61. The method of claim 60, wherein the subscriber's call related events include call set up, call termination, call hold, call waiting, call transfer, and call forwarding.

62. An apparatus for monitoring a subscriber's call related events in a radiocommunication system comprising:

means for sending a first timer value from a home location register (HLR) with a message to a first node in which the subscriber's call related events remain pending;

means for waiting in the first node until a first time period based on the first timer value has elapsed; and means for reporting the call related events in the first node to the HLR upon expiration of the first timer value.

63. The apparatus of claim 62, wherein the subscriber's call related events include call set up, call termination, call hold, call waiting, call transfer, and call forwarding.

64. A method for preventing fraudulent activity in a radiocommunication system comprising the steps of:

sending a timer value from a home location register (HLR) with a message to a first node in which a subscriber's call related events are pending, wherein the timer value is based upon a risk of fraudulent activity by the subscriber;

waiting in the first node until a time period based on the timer value has elapsed; and reporting the subscriber's call related events in the first node to the HLR upon expiration of the time period.

* * * * *